United States Patent Office 3,634,432
Patented Jan. 11, 1972

3,634,432
C-ARALKYL-N-SUBSTITUTED ALKYLENEIMINES

Robert Paul Mull, Florham Park, and Renat Herbert Mizzoni, Long Valley, N.J., assignors to Ciba Corporation, Summit, N.J.
No Drawing. Continuation-in-part of application Ser. No. 480,165, Aug. 16, 1965. This application Aug. 6, 1969, Ser. No. 848,118
The portion of the term of the patent subsequent to Jan. 30, 1985, has been disclaimed
Int. Cl. C07d 29/18
U.S. Cl. 260—293.67                                6 Claims

ABSTRACT OF THE DISCLOSURE

Free or functionally converted N-hydroxyalkyl-C-aralkyl-alkyleneimines, e.g. those of the formula

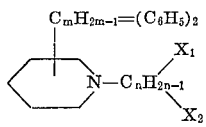

$m = 1-4$, $n = 3-8$
$X_1 = $ OH, alkoxy, acyloxy or halogeno
$X_2 = $ H or $X_1$ quaternaries and salts thereof decrease gastric secretion.

CROSS-REFERENCES TO RELATED APPLICATIONS

This is a continuation-in-part of application Ser. No. 693,734, filed Dec. 27, 1967, which in turn is a continuation-in-part of application Ser. No. 480,165, filed Aug. 16, 1965, now abandoned, which in turn is a continuation-in-part of application Ser. No. 416,154, filed Dec. 4, 1964, now abandoned.

SUMMARY OF THE INVENTION

The present invention concerns and has for its object the provision of new N-hydroxyalkyl-C-aralkyl-alkyleneimines, the esters, quaternaries and salts thereof, particularly of those having the Formula I:

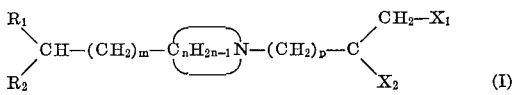

in which one of $R_1$ and $R_2$ is a phenyl radical and the other is hydrogen or a phenyl radical, $X_1$ is free, esterified or etherified hydroxy, $X_2$ is hydrogen or hydroxy, $n$ is an integer from 4 to 8 and each of $m$ and $p$ is an integer from 0 to 2 when $X_1$ is etherified hydroxy and $X_2$ hydrogen, or $m$ is 0 to 2 and $p$ is 1 or 2 when $X_2$ is hydroxy, or the sum $m+p$ is 1 to 4 when $X_1$ is free or esterified hydroxy and $X_2$ hydrogen of lower alkyl quaternaries and acid addition salts thereof, as well as of corresponding pharmaceutical compositions and methods for the preparation and application of these products. Said compositions are useful agents for the management and treatment of gastric irritation or of gastric ulcers by reducing the amount of free acid in the stomach.

DESCRIPTION OF THE PREFERRED EMBODIMENTS

The above phenyl radicals $R_1$ and $R_2$ may be unsubstituted or substituted by one or more than one of the same or of different substituents, such as lower alkyl, e.g. methyl, ethyl, n- or i-propyl, free or etherified hydroxy or mercapto, e.g. methoxy, ethoxy or methylenedioxy, methyl- or ethylmercapto, halogen, e.g. fluoro, chloro or bromo, trifluoromethyl, nitro or amino, for example, lower alkyl- or di-lower alkylamino, e.g. methylamino, ethylamino, dimethylamino, diethylamino or methylethylamino.

The alkyleneimino ring

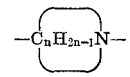

substituted at a ring-carbon atom thereof by the above defined aralkyl radical, contains a straight or branched alkylene group and represents above all piperidino, but also, for example, pyrrolidino, 1,5-, 1,6- or 2,5-hexamethyleneimino, 1,5-, 1,6-, 1,7- or 2,6-heptamethyleneimino or 1,8-, 3,6- or 3,7-octamethyleneimino.

The esterified hydroxy group $X_1$ is, for example, a halogen atom, preferably chlorine or bromine, but it may also be fluorine or iodine, or it is esterified with an aliphatic, alicyclic, araliphatic, aromatic or heterocyclic carboxylic acid having less than 20 carbon atoms, e.g. such mentioned below. The etherified hydroxy group $X_1$ is, for example, lower alkoxy, e.g. methoxy, ethoxy, n- or i-propoxy, n-, i-, sec. or tert. butoxy, or aralkoxy, e.g. benzyloxy, 1- or 2-phenethoxy, 1-, 2- or 3-phenylpropoxy or -butoxy, or 2-tetrahydropyranyloxy.

The compounds of the invention possess valuable pharmacological properties. For example, they cause a marked decrease of the gastric secretion, especially of gastric hydrochloric acid, which can be demonstrated, in mammals, such as dogs, for example, at a dosage range between about 1–50 mg./kg./day, preferably 5–10 mg./kg./day, whereby the gastric secretion is induced in dogs either by food or by parenteral application of histamine. Besides their above-mentioned utility, the compounds of the invention are also useful as research tools in the study of the releasing mechanism of the gastric secretion and as starting materials or intermediates in the manufacture of other valuable compounds, especially medicines.

Particularly useful are the 5 to 7 ring-membered compounds of the Formula I, in which $R_1$ is phenyl, (lower alkyl)-phenyl, (lower alkoxy)-phenyl, (halogeno)-phenyl, (trifluoromethyl)-phenyl or (di-lower alkylamino)-phenyl, $R_2$ is hydrogen or one of the radicals mentioned for $R_1$, $X_1$ is hydroxy, lower alkoxy, 2-tetrahydropyranyloxy, $R_1$-lower alkoxy, halogen or the acyloxy radical of a carboxylic acid having less than 20 carbon atoms, and $X_2$, $m$, $n$ and $p$ have the meaning given above, or lower alkyl quaternaries or therapeutically acceptable acid addition salts of these compounds.

Especially valuable are those compounds of Formula I, in which $R_1$ is phenyl, $R_2$ is hydrogen or phenyl, $C_nH_{2n}$ is 1,5-pentylene and:

(a) $X_1$ is methoxy, ethoxy or 2-tetrahydropyranyloxy, $X_2$ is hydrogen and each of $m$ and $p$ is an integer from 0 to 2;

(b) $X_1$ is hydroxy, chloro, acetoxy, ethoxy or 2-tetrahydropyranyloxy, $X_2$ is hydroxy, $m$ is an integer from 0 to 2 and $p$ is the integer 1 or 2;

(c) $X_1$ is hydroxy, chloro or acetoxy, $X_2$ is hydrogen, each of $m$ and $p$ is an integer from 0 to 2 but the sum $m+p$ is 1 to 4; as well as therapeutically acceptable acid addition salts of these compounds which, when given orally to unanesthetized trained dogs having a Pavlov Pouch, at a dosage between about 5 and 50 mg./kg./day, preferably between about 5 and 10 mg./kg./day, show an outstanding inhibition of the food or histamine induced gastric secretion.

Of the above-mentioned compounds, having at least one asymmetric center, the dextrorotatory antipode is preferred, which usually exhibits a higher degree of gastric secretion inhibition than the corresponding racemate.

The compounds of the present invention are prepared by methods in themselves known. For example, the process for their preparation consists in (a) Replacing in an N-(R,R'-alkyl)-alkyleneimine, containing in the ring an aralkyl radical, in which both of the substituents R and R' stand for a radical capable of being converted into free, etherified, or esterified hydroxy or one of them stands for hydrogen, said substituents by free hydroxy, lower alkoxy or aralkoxy or hydroxy esterified with a hydrohalic or carboxylic acid or (b) Adding water, hydrogen peroxide, a lower alkanol or aralkanol, a halo-lower alkyl lower alkyl or aralkyl ether, a hydrohalic, hypohalous, carboxylic or percarboxylic acid to an N-alkenylalkyleneimine, containing in the ring an aralkyl radical, and solvolysing any epoxide formed or (c) Reacting an N-unsubstituted alkyleneimine, containing in the ring an aralkyl radical, with an alkylene oxide, a hydroxy alkylene oxide or a lower alkyl or aralkyl ether or a hydrohalic or carboxylic acid ester thereof or with an alkanediol or triol of which one hydroxy group is reactively esterified or a lower alkyl or aralkyl ether or a hydrohalic or carboxylic acid ester thereof or (d) Reducing in an N-hydroxyalkyl-alkyleneimine, containing in the ring an aralkyl radical, and in the ring and/or alkyl chain at least one carbamyl or ethylene grouping, a lower alkyl or aralkyl ether or a hydrohalic or carboxylic acid ester thereof, said grouping to the methyleneimino or ethylene grouping respectively or (e) Reducing in an N-(R", R'"-alkyl)-alkyleneimine, containing in the ring an aralkyl radical, in which both of the substituents R" and R'" stand for an oxo group separated from the imino nitrogen by at least two carbon atoms or for a free or esterified carboxy group separated from the imino nitrogen by at least one carbon atom, or one of R" and R'" stands for hydrogen, said substituents to hydroxy or hydroxymethyl respectively and, if desired, converting the final products into each other.

The substituents R and R' capable of being converted into a free, etherified or esterified hydroxy stand, for example, for a sulfonyloxy or diazo group, whereas those capable of being converted into halogen may stand for sulfonyloxy, free or acylated amino, diazo or carboxy salified with a metal, e.g. silver, mercury or potassium.

Starting compounds in which at least one of R and R' represents aliphatic or aromatic sulfonyloxy, such as methane-, ethane-, benzene, or p-toluenesulfonyloxy, may be reacted with metal hydroxides, lower alkanolates or aralkanolates, carboxylates or halides, such as sodium or potassium hydroxide, methylate, ethylate or benzylate, a lithium, sodium or potassium salt of a carboxylic acid or lithium chloride or bromide. Diazonium salts may be reacted with aqueous acids, lower alkanols or aralkanols, carboxylic or hydrohalic acids, advantageously in the presence of catalysts, such as cuprous salts, e.g. cuprous chloride, in order to replace the diazo group by free or esterified hydroxy. The above said compounds in which at least one or R and R' represents amino, can be converted into the corresponding halides by reaction with a nitrosyl halide, e.g. nitrosyl chloride or bromide. The acylamino compounds, for example the benzoylamino compounds, can be reacted with a phosphorus pentahalogenide, such as phosphorus pentachloride or pentabromide. The salts, especially the silver salts, or the N-carboxyalkyl-alkyleneimine starting compounds may be reacted with halogen, e.g. fluorine, chlorine, bromine or iodine, whereby carbon dioxide is split off and the new haloalkyl compounds are formed.

The addition of water, a lower alkanol or aralkanol, a halo-lower alkyl lower alkyl or aralkyl ether or a carboxylic acid to the N-alkenyl-alkyleneimine starting compounds advantageously is carried out in the presence of a strong acid, such as sulfuric acid or a Lewis acid, e.g. boron trifluoride, zinc bromide, aluminum chloride, bismuth or antimony trichloride; the latter of which are especially used in the addition of a hydrohalic acid. The addition of halogen to the alkenyl group normally takes place without the use of a catalyst as is the case with a hypohalous or percarboxylic acid, such as hypobromous, peracetic or perbenzoic acid. Hydrogen peroxide advantageously is used in the presence of acids, e.g. formic or pertungstic acid, or of an acidic oxide, e.g. selenium dioxide or osmium tetroxide. Any epoxide formed can be opened by solvolysis, for example, by the action of strong acids, such as aqueous sulfuric or perchloric acid, a carboxylic or hydrohalic acid, in the presence or absence of lower alkanols or aralkanols, or in the presence of the latter also by the action of bases, e.g. alkali metal alcoholates.

The alkylene oxides may advantageously be reacted with the N-unsubstituted alkyleneimine starting compounds in the presence of small amounts of water and/or acids, e.g. hydrochloric acid. The reactively esterified hydroxy-compounds mentioned above are, for example, hydrohalic or sulfonic acid esters, such as the hydrochloric, hydrobromic, benzene- or p-toluenesulfonic acid ester. In case said hydrohalic acid esters contain one or two halogen atoms more, these should have a smaller atomic weight than that of the halogen atom representing the reactively esterified hydroxy group. These compounds are advantageously reacted with the N-unsubstituted alkyleneimine starting compounds in the presence of a condensing agent, for example, an inorganic or organic base, such as an alkali metal carbonate, e.g. sodium or potassium carbonate, or a tertiary nitrogen base, e.g. trimethylamine or pyridine.

The carbamyl grouping present in the free, etherified, or esterified N-hydroxyalkyl-alkyleneimine starting compounds can be reduced to the methyleneimine grouping, for example, with a complex light metal hydride, e.g. lithium aluminum hydride. Those starting materials containing a double bond (or ethenylene grouping respectively), it preferably extends from the ring carbon atom that carries the unsaturated hydrocarbon radical, may be reduced with catalytically activated or nascent hydrogen, e.g. hydrogen in the presence of palladium or Raney nickel.

Finally the starting compounds containing at least one oxo or carboxy group in the alkyl chain can be reduced to the corresponding hydroxy-compounds, for example, with catalytically activated or nascent hydrogen, e.g. hydrogen in the presence of platinum oxide or Raney nickel or hydrogen generated by the reaction of a metal, e.g. sodium, magnesium or aluminum, or an amalgam thereof, with aqueous solutions or alcohols, e.g. lower alkanols, with alcohols in the presence of aluminum alkoxides, e.g. aluminum isopropoxide, or advantageously with complex light metal hydrides, e.g. lithium aluminum hydride or sodium borohydride. In the latter case the analogous reactions under (d) and (e) may be combined by selecting the appropriate starting materials.

The final products of this invention may be converted into each other by methods in themselves known. Thus, for example, an N-hydroxyalkyl-alkyleneimine obtained may be reacted with a halogenating agent, for example, a hydrohalic acid, such as hydrochloric, hydrobromic or hydroiodic acid, a sulfur halogenide, such as sulfur tetrafluoride, disulfur dichloride or dibromide, a thionylhalide, such as thionylchloride or -bromide, a phosphorus halide, such as phosphorus trichloride, tribromide or triiodide or a phosphoric acid halide, such as phosphorus oxychloride or -bromide, triphenoxy-phosphorus dichloride or bromide, triphenoxy-phosphorus dichloride or triphenoxybenzyl-phosphorus bromide; or with a reactive functional derivative of a carboxylic acid, such as a halide or anhydride thereof. Esters obtained may be hydrolyzed or transesterified, e.g. by reaction with aqueous bases, alcohols or carboxylic acids in the presence of acids or bases. The quaternaries are obtained from the free compounds by reacting them preferably with reactively esterified lower alkanols.

The above mentioned reactions are carried out according to standard methods, in the presence or absence of diluents, preferably such as are inert to the reagents and are solvents thereof, of catalysts, condensing agents and/ or inert atmospheres, at atmospheric or superatmospheric pressure, at low temperatures, room temperature or elevated temperatures.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogen-benzene-sulfonic, toluenesulfonic, naphthalenesulfonic and sulfanilic acid; methionine, tryptophan, lysine and arginine.

These or other salts of the new compounds, for example, the picrates, can be used also for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts.

Mainly, those starting materials should be used in the reactions of the invention that lead to the formation of those compounds indicated above as being specially valuable.

The starting materials are known or, if they are new, may be prepared by methods in themselves known. Several starting materials, for example, those mentioned under (c) and the aminoalkyl compounds covered by the process mentioned under (a) are described in our United States Pat. No. 3,252,983 which issued May 24, 1966. The N-aminoalkyl-alkyleneimines can be acylated or diazotated respectively, for example, with an acid halide, such as benzoyl chloride or with nitrous acid.

The N-carboxyalkyl-alkyleneimines can be prepared from the corresponding N-unsubstituted alkyleneimines by reaction with halogenated alkanoic acid esters, advantageously in the presence of a base, e.g. those mentioned above. Thereupon the ester obtained may be hydrolyzed and converted into a metal salt by the usual methods.

The N-alkenyl-alkyleneimine starting compounds may be prepared from the N-unsubstituted alkyleneimines by reaction with a reactive esterified alkenol, for example, an aryl sulfonyloxy- or halogeno-alkene in the presence of a suitable base.

Finally the N-hydroxyalkyl-alkyleneimines containing at least one carbamyl or ethenylene grouping and the N-oxoalkyl-alkyleneimines may be prepared analogous to the method described under (c) by selecting the appropriate reagents, for example, by reaction of an N-unsubstituted alkenyleneimine or oxoalkyleneimine containing in the ring an unsaturated hydrocarbon radical with an alkylene oxide, such as ethylene oxide or 1,2-propylene oxide, a free or reactively esterified alkylene halohydrin, e.g. ethylene chlorohydrin, 1 - chloro - 2 - bromo - ethane, 1 - bromo - 3 - p - tosyloxy - propane or a 1 - bromo-2-lower alkanoyloxy-ethane, or by reaction of a corresponding N-unsubstituted alkyleneimine or alkenyleneimine with an esterified hydroxy alkanoyl halide, e.g. chloracetyl chloride or β - benzoyloxy - propionyl - chloride, or a reactively esterified hydroxy-alkanol or -alkanone or an acetal or ketal thereof.

Starting materials or final products that are mixtures of isomers may be separated into simple isomers by methods in themselves known. For example, compounds that contain one or more asymmetrical carbon atoms may be in the form of racemate mixtures, pure racemates or optical antipodes.

Mixtures of racemates, by virtue of the physicochemical differences between the components, can be resolved into the stereoisomeric pure racemates (diastereoisomers), for example, by chromatography and/or fractional crystallization. Racemic products can likewise be resolved into the optical antipodes, for example, by reaction with optically active acids, separation of the diastereomeric salts and liberation of the bases from the salts.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth gelatin, tragacanth, methylcellulose, sodium carboxymethylcellulose, and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

Example 1

To a mixture of 13.4 g. of 3-bromo-propanol, 100 ml. of benzene, 18 g. of sodium carbonate and a trace of water, the solution of 25.1 g. of 3-benzhydryl-piperidine in 75 ml. of benzene is added and the whole is refluxed with stirring for 20 hours. After cooling the reaction mixture is filtered, the filtrate evaporated, the residue fractionated and the fraction boiling at 205–220°/0.1 mm. collected; it represents the N-(3-hydroxy-propyl)-3-benzhydrylpiperidine of the formula:

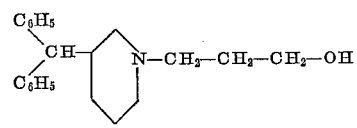

Example 2

10 g. of N-(3-hydroxypropyl)-3-benzhydryl-piperidine in 50 ml. of benzene are added with stirring to 4.3 g. of thionyl chloride in 50 ml. of benzene. The reaction mixture is refluxed for 5 hours, stirred overnight at room temperature and hereupon concentrated under reduced pressure. The precipitated N-(3-chloropropyl)-3-benzhydryl-piperidine hydrochloride of the formula

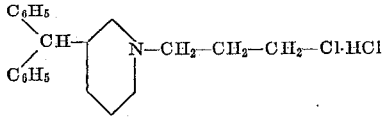

is hygroscopic and easily consumes one mole of water; the monohydrate melts at 68–82°.

Example 3

The solution of 25.1 g. of 3-benzhydryl-piperidine in 50 ml. of benzene is added to a mixture of 15.7 g. of 1-bromo-3-chloro-propane, 100 ml. of benzene, 18 g. of sodium carbonate and a trace of water. The reaction mixture is refluxed with stirring for 20 hours, hereupon filtered, the filtrate gassed with hydrogen chloride and concentrated in vacuo. The precipitated N-(3-chloropropyl)-3-benzhydryl-piperidine hydrochloride is recrystallized from benzene and dried in a high vacuum; it is identical with the product obtained according to Example 2.

Example 4

The solution containing 25.0 g. of N-allyl-3-benzhydryl-piperidine and a trace of benzoyl peroxide in 120 ml. of benzene is treated with hydrogen chloride for 20 hours. After concentration of the reaction mixture under reduced pressure, there is obtained the N-(3-chloropropyl)-3-benzhydryl-piperidine-hydrochloride, which is identical with the product obtained according to Example 2.

The solution of the starting material is obtained by refluxing the mixture of 25.1 g. of 3-benzhydryl-piperidine, 150 ml. of benzene, 12.1 g. of allyl bromide, 18 g. of sodium carbonate and a trace of water for 20 hours with stirring and filtering the reaction mixture.

Example 5

A solution of 30.1 g. of N-(3-aminopropyl)-3-benzhydrylpiperidine in 22 g. of concentrated hydrochloric acid is diluted with 75 ml. of water, cooled to 0° and mixed with a solution of 7 g. of sodium nitrite in 20 ml. of water. Thereupon the mixture, containing the diazonium salt, is added to 50 g. of a boiling 10% solution of cuprous chloride in concentrated hydrochloric acid. After cooling the reaction mixture is extracted with benzene and the extracts concentrated under reduced pressure. The N-(3-chloropropyl)-3-benzhydryl-piperidine hydrochloride so obtained is recrystallized from benzene and dried in a high vacuum; it is identical with the product obtained according to Example 2.

Example 6

A mixture of 25.1 g. of 3-benzhydryl-piperidine, 11.1 g. of 3-chloro-1,2-propanediol, 20.0 g. of sodium carbonate and a trace of water is refluxed for 20 hours while stirring. The hot solution is filtered, the residue washed with hot benzene and the filtrate evaporated under reduced pressure. The residue is distilled in vacuo and the fraction boiling at 195–205°/0.45 mm. collected; it represents the N(2,3-dihydroxy-propyl)-3-benzhydryl-piperidine of the formula:

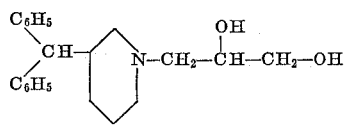

It can be converted into its hydrochloride as described in Example 3.

Example 7

Other compounds of this invention which are prepared according to the above described and illustrated procedure by selecting equivalent amounts of the appropriate starting materials are, for example, the following:

| Starting material | Reagent | Final product |
|---|---|---|
| 2-benzhydryl-piperidine. | 3-bromo-propanol. | N-(3-hydroxy-propyl)-2-benzhydryl-piperidine. |
| 4-benzhydryl piperidine. | 1-chloro-2-propanol. | H-(2-hydroxy-propyl)-4-benzhydryl piperidine. |
| 3-(di-para tolyl-methyl)-piperidine. | 1-bromo-3-chloro-propane. | N-(3-chloro-propyl)-3-(di-para tolyl-methyl)-piperidine hydrochloride. |
| N-(2,3-dihydroxy-propyl)-3-benzhydryl-piperidine. | Thionyl chloride. | N-(2,3-dichloro-propyl)-3-benzhydryl-piperidine hydrochloride. |
| 3-(di-para chlorophenyl methyl)-piperidine. | 4-bromo-butanol. | N-(4-hydroxy-benzyl)-3-(di-para chloro-phenyl-methyl)-piperidine. |
| 3-(α-cyclohexyl-benzyl)-piperidine. | Ethylene chlorohydrin. | N-(2-hydroxy-ethyl)-3-(α-cyclohexyl-benzyl)-piperidine. |
| 3-(di-para methoxy-phenyl-methyl)-piperidine. | 1-bromo-3-chloro-propane. | N-(3-chloro-propyl)-3-(di-para methoxy-phenyl methyl)-piperidine hydrochloride. |
| 3-fluorenyl-(9)-piperidine. | Ethylene bromohydrin. | N-(2-hydroxy-ethyl)-3-fluorenyl-(9)-piperidine. |
| N-(3-amino-propyl)-3-(α-para fluorophenyl-benzyl)-piperidine. | Nitrous and hydrochloric acid. | N-(3-chloro-propyl)-3-(α-para fluorophenyl-benzyl)-piperidine hydrochloride. |
| 3-(1,2-diphenyl-ethyl)-yl)-piperidine. | 3-chloro-1,2-propanediol. | N(2,3-dihydroxy-propyl)-3-(1,2-diphenyl-ethyl)-piperidine. |
| N-(3-hydroxy-propyl)-3-(di-ortho methoxy phenyl-methyl)-piperidine. | Thionyl bromide. | N-(3-bromo-propyl)-3-(di-ortho methoxy phenyl methyl)-piperidine hydrobromide. |
| 3-(di-para diethyl-aminophenyl-methyl)-piperidine. | 1-bromo-2-methyl-4-chlorobutane. | N-(4-chloro-2-methyl-butyl)-3-(di-para diethylaminophenyl-methyl)-piperidine hydrochloride. |
| 3-triphenylmethyl-piperidine. | Ethylene chlorohydrin. | N-(2-hydroxy-ethyl)-3-triphenylmethyl-piperidine. |
| N-(2-amino-ethyl)-3-benzyl-piperidine. | Nitrous and hydrochloric acid. | N-(2-chloro-ethyl)-3-benzyl-piperidine hydrochloride. |
| 3-benzhydryl-pyrrolidine. | 3-bromo-propanol. | N-(3-hydroxy-propyl)-3-benzhydryl-pyrrolidine. |

Example 8

Preparation of 500 capsules each containing 0.01 g. of the active ingredient.

Ingredients: G.
N - (3 - chloro - propyl) - 3 - benzhydryl-piperidine - hydrochloride _____ 5.000
Lactose _____ 85.000

Procedure.—The ingredients are blended in a suitable mixer, sieved through a No. 40 screen and again mixed; portions weighing 0.18 g. each of the resulting mixture are filled into No. 4 capsules.

Example 9

Preparation of 160,000 tablets each containing 0.025 g. of the active ingredient.

Ingredients: G.
N - (2,3 - dihydroxy - propyl) - 3 - benzhydryl - piperidine hydrochloride _____ 4,000.0
Lactose _____ 28,289.0
Corn starch _____ 3,410.0
Confectioners' sugar _____ 2,800.0
Colloidal silica _____ 1,000.0
Stearic acid powder _____ 400.0
Calcium stearate _____ 100.0
Color F D & C yellow No. 5 _____ 1.0
Purified water q.s.

Procedure.—The hydrochloride, the lactose, 2,500 g. of the corn starch, the confectioners' sugar and the colloidal silica are passed through a No. 16 screen into a mixer and blended at low speed for twenty minutes. The remainder of the corn starch is suspended in a cold solution of the color in 1,000 ml. of purified water, and a paste is formed by gradually adding 4,000 ml. of boiling purified water. The mixed powders are granulated with the above paste, using additional water as required.

The resulting moist mass is passed through a mill, using a No. 4A screen, placed on trays and dried at 38° C. until the moisture content is between 2 percent and 3 percent. The granules are broken on a mill, passed through a No. 16 screen, and treated with the stearic acid and the calcium stearate, both screened through a No. 20 screen. After mixing for twenty minutes, the granulation is compressed into tablets, each weighing 0.25 g., using 11/32 inch dies, standard concave punches, uppers bisected, lowers monogrammed.

Example 10

The mixture of 34.0 g. 2-(2,2-diphenyl-ethyl)-piperidine, 16.0 g. 2-bromo-ethanol, 23.0 g. sodium carbonate, 400 ml. benzene and a few drops of water is refluxed for 20 hours while stirring. The reaction mixture is filtered, the filtrate evaporated, the residue distilled and the fraction boiling at 165 to 175°/0.012 mm. collected. It represents the N-(2-hydroxy-ethyl)-2-(2,2-diphenyl-ethyl)-piperidine of the formula

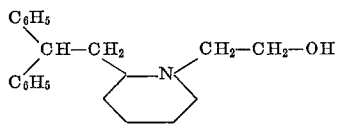

Example 11

To the solution of 13.4 g. N-(2-hydroxy-ethyl)-2-(2,2-diphenyl-ethyl)-piperidine in 100 ml. benzene the mixture of 3.65 ml. thionyl chloride and 100 ml. benzene, is added slowly and the whole is refluxed for 8 hours while stirring and stirring is continued at room temperature overnight. The reaction mixture is filtered and the residue recrystallized from benzene to yield the N-(2-chloro-ethyl)-2-(2,2-diphenyl-ethyl)-piperidine hydrochloride of the formula

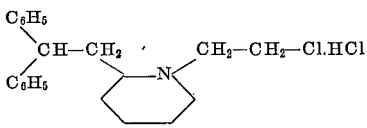

melting at 181 to 182°.

Example 12

To the stirred mixture of 10.0 g. 3-benzhydryl-piperidine 50 ml. of benzene, 10.0 g. sodium carbonate and 1 drop water, the solution of 6.1 g. 2-bromoethyl ethyl ether in 50 ml. benzene is added dropwise. The mixture is stirred and refluxed for 24 hours, hot filtered, the filtrate evaporated, the residue distilled and the fraction boiling at 157°/0.075 mm. collected; it represents the N-(2-ethoxy-ethyl)-3-benzhydryl-piperidine of the formula

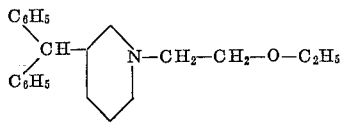

Example 13

To the mixture of 10.0 g. 4-benzhydryl-piperidine, 50 ml. benzene, 10.0 g. sodium carbonate and 1 drop water the solution of 6.1 g. 2-bromoethyl ethyl ether in 50 ml. benzene is added while stirring and the reaction mixture is refluxed and stirred for 24 hours. It is hot filtered, the filtrate evaporated, the residue distilled and the fraction boiling at 152–157°/0.175 mm. collected; it represents the N-(2-ethoxy-ethyl)-4-benzhydryl-piperidine of the formula

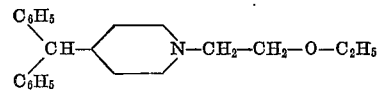

Example 14

To the mixture of 15.0 g., 3-benzhydryl-piperidine, 100 ml. n-butanol, 20.0 g. sodium carbonate and 2 drops water the solution of 8.3 g. 3-acetoxy-propylchloride in 25 ml. n-butanol is added and the mixture refluxed for 4 days while stirring. It is filtered, the filtrate evaporated in vacuo, the residue distilled and the fraction boiling at 175–182°/0.35 mm. collected; it represents the N-(3-acetoxy-propyl)-3-benzhydryl-piperidine of the formula

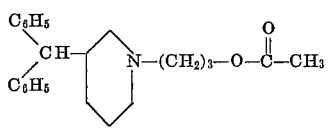

Example 15

3.53 g. of thionylchloride are added dropwise to a solution of 8.8 g. of N-(2,3-dihydroxy-propyl)-3-benzhydryl-piperidine in 150 ml. of benzene. The reaction mixture is refluxed for 4 hours, stirred at room temperature overnight and concentrated in vacuo. On adding ether to the residue, the product solidifies and one obtains the N-(2-hydroxy-3-chloro-propyl)-3-benzhydryl-piperidine hydrochloride of the formula

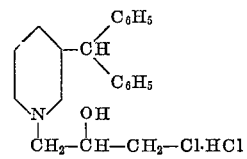

which melts at 90–100° (hygroscopic).

The starting material is prepared as follows: A mixture of 10 g. of 3-diphenylmethyl-piperidine, 4.42 g. of 3-chloro-1,2-propandiol and 10 g. of sodium carbonate in 200 ml. of n-butanol is refluxed overnight. The reaction mixture is filtered hot and concentrated in vacuo. The residue is fractionated and the fraction boiling at 195–210°/0.45 mm. collected. It is N-2,3-dihydroxy-propyl)-3-benzhydryl-piperidine.

Example 16

10 g. of N-(2-hydroxy-ethyl)-3-benzhydryl-piperidine are dissolved in 50 ml. of acetone and 20 ml. of methyl iodide are added to the solution. The solution warms up and is heated on the steam bath for 15 minutes. After standing at room temperature overnight, the solution is triturated with ethyl ether, whereby a white precipitate, N-methyl - N - (2-hydroxy-ethyl) - 1 - benzhydryl-piperidinium iodide of the formula

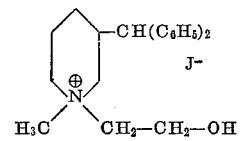

is formed, which melts at 100° C.

Example 17

A mixture of 10 g. of 3-diphenylmethyl-piperidine, 6.55 g. of 2-(β-chloro-ethoxy)-tetrahydropyran and 20 g. of sodium carbonate in 100 ml. of n-butanol containing a few drops of water is refluxed for 4 days with vigorous stirring. The reaction mixture is filtered, the filtrate concentrated in vacuo, the residual oil fractionated and the fraction boiling at 205–209°/0.15 mm. collected; it represents the N-[2-(2-tetrahydropyranyloxy)-ethyl]-3-benzhydryl-piperidine of the formula

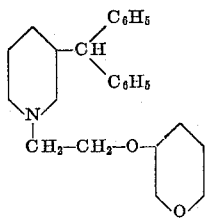

Example 18

24.2 g. 1-(2-hydroxy-ethyl)-4-(3-phenyl-propyl)-pyridinium chloride are dissolved in 60 ml. methanol and hydrogenated in the presence of 0.45 g. platinum oxide at 48° and an initial pressure of 50 p.s.i. until the pressure reduces to 22 p.s.i. The reaction mixture is filtered and evaporated in vacuo to yield the 1-(2-hydroxy-ethyl)-4-(3-phenyl-propyl)-piperidine hydrochloride of the formula

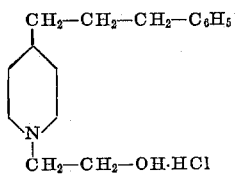

which melts after recrystallization from ethanol at 115–116°.

The starting material is prepared as follows: 99.0 g. 4-(3-phenyl-propyl)-pyridine are suspended in 150 ml. toluene and 53.2 g. 2-chloro-ethanol are added all at once while stirring. The mixture is refluxed for 24 hours, allowed to cool to room temperature and then placed into an ice bath. It is diluted with 50 ml. toluene and filtered to yield the very hygroscopic 1-(2-hydroxy-ethyl)-4-(3-phenyl-propyl)-pyridinium chloride which is washed with 200 ml. toluene and dried in a vacuum desiccator.

Example 19

17.0 g. 1-(2-hydroxy-ethyl)-4-(3-phenyl-propyl)-piperidine are dissolved in 100 ml. benzene and to the solution 9.0 g. thionyl chloride in 100 ml. benzene are added dropwise while stirring. The mixture is refluxed for 5 hours and stirred overnight. It is then filtered, the residue washed with benzene and recrystallized from ethanol to yield the 1-(2-chloro-ethyl)-4-(3-phenyl-propyl)-piperidine hydrochloride of the formula

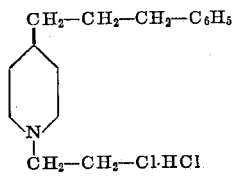

melting at 173–174°.

The starting material is prepared as follows: 17.0 g. 1-(2-hydroxy-ethyl) - 4(3-phenyl-propyl)-piperidine hydrochloride are dissolved in 50 ml. water. The solution is heated to 35° and 5 ml. of 50% aqueous sodium hydroxide are added while stirring. The mixture is extracted three times with methylene chloride, the extracts washed with water, dried and evaporated under reduced pressure. The residual base is used without further purification.

Example 20

The mixture of 10.0 g. 3-benzhydryl-piperidine, 12.35 g. 2 - (3 - chloro-propoxy)-tetrahydropyran, 100 ml. n-butanol, 20.0 g. sodium carbonate and 1 drop water is refluxed for 4 days while stirring. It is filtered hot, the filtrate evaporated in vacuo, the residue distilled and the fraction boiling at 215–220°/0.1 mm. Hg collected; it represents the N-[3 - (2 - tetrahydropyranyloxy-propyl]-3-benzhydryl-piperidine of the formula

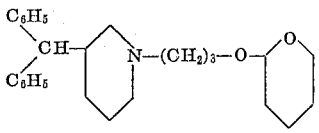

Example 21

The mixture of 5.0 g. d-3-benzhydryl-piperidine, 3.3 g. 2 - (2-chloro-ethoxy)-tetrahydropyran, 90 ml. butanol, 10.0 g. sodium carbonate and 1 drop of water is refluxed for 4 days while stirring. It is filtered hot, the filtrate evaporated in vacuo, the residue distilled and the fraction boiling at 205–209°&0.15 mm. Hg collected; it represents the d-N[2 - (2 - tetrahydropyranyloxy)-ethyl] - 3-benzhydryl-piperidine $[\alpha]_D^{25} = +5.68$ (31.4μg./ml. in ethanol).

The starting material used is prepared as follows: The mixture of 35.7 g. d,1-3-diphenylmethyl-piperidine, 26.8 g. benzyl bromide, 50.0 g. sodium carbonate, 400 ml. n-butanol and 4 drops of water is refluxed for 48 hours while stirring. It is filtered hot and the filtrate evaporated in vacuo. The residue is recrystallized from ethanol to yield 40.0 g. d,1-1-benzyl - 3 - diphenylmethyl-piperidine melting at 94–96°.

40.0 g. thereof are dissolved in 400 ml. hot acetone and to the solution 8.8 g. d-tartaric acid in 400 ml. hot acetone are added. The mixture is boiled for a few minutes whereupon precipitation occurs. It is allowed to stand at room temperature overnight and is then filtered to yield 24.3 g. d-1 - benzyl-3-diphenylmethyl-piperidine d-tartrate which melts, after recrystallization from acetone, at 137–139°; $[\alpha]_D^{25} = +7.18°$ (in water). [The mother liquor (A) contains the corresponding enantiomer and is worked up as described below.]

24.3 g. thereof are dissolved in the minimal amount of water, the solution is made basic with 40% aqueous sodium hydroxide and extracted 3 times with 75 ml. methylene chloride. The combined extracts are dried and evaporated in vacuo to yield the d-1-benzyl-3-diphenylmethyl-piperidine melting at 84–86°, after recrystallization from ethanol; $[\alpha]_D^{25} = -6.33°$ (in ethanol, c.=17.5).

10.0 g. thereof are hydrogenated in 225 ml. anhydrous ethanol over 5.0 g. 10% palladium-charcoal at 40–50° and 45 p.s.i. for 8 hours. The mixture is allowed to cool overnight, it is filtered, the filtrate evaporated in vacuo, the residue distilled and the fraction boiling at 135–140°/0.02 mm. Hg collected: it represents the d-3-diphenylmethyl-piperidine, M.P. 69–72°, $[\alpha]_D^{25} = +9.01°$ (in ethanol, c.=11). The hydrochloride thereof melts at 218–219° after recrystallization from acetonitrile.

The mother liquor (A) is concentrated in vacuo, the concentrate made basic with 40% aqueous sodium hydroxide and the mixture extracted 3 times with 75 ml. methylene chloride. The combined extracts are dried and evaporated in vacuo to yield 20.0 g. crude l-1-benzyl-3-diphenylmethyl-piperidine d-tartrate.

20.0 g. thereof are dissolved in 250 ml. hot acetone and to the solution 4.4 g. l-tartaric acid in 250 ml. hot acetone are added. The mixture is boiled for a few minutes, whereon a precipitate is formed. It is allowed to stand overnight at room temperature, whereupon it is filtered to yield 13.9 g. 1 - 1 - benzyl-3-diphenylmethyl-piperidine l-tartrate melting at 137–139° after recrystallization from acetone; $[\alpha]_D^{25} = -7.79°$ (in ethanol, c.=10).

13.9 g. thereof are dissolved in the minimal amount of water, the solution made basic with 40% aqueous sodium hydroxide, extracted 3 times with 75 ml. methylene chloride, the extract dried and evaporated in vacuo to yield the 1-1-benzyl-3-diphenylmethyl-piperidine, melting at 84–86° after recrystallization from ethanol: [α]$_D^{25}$=+7.80° (in ethanol, c.=21.5).

8.0 g. thereof are hydrogenated in 200 ml. anhydrous ethanol over 4.0 g. 10% palladium-charcoal at 40–50° and 45 p.s.i. for 8 hours. After cooling overnight it is filtered, the filtrate evaporated in vacuo, the residue distilled and the fraction boiling at 135–140°/0.02 mm. Hg collected, to yield the l-3-diphenylmethyl-piperidine melting at 67–70°; [α]$_D^{25}$=−6.71° (in ethanol, c.=11.5). Its hydrochloride melts at 218–219° after recrystallization from acetonitrile.

Example 22

To the solution prepared from 0.3 g. sodium and 10 ml. anhydrous ethanol, the solution of 3 g. N-(2-chloroethyl-3-benzhydryl-piperidine in the minimum amount of benzene is added dropwise while stirring and the mixture is refluxed for 6 hours. It is filtered hot, the filtrate evaporated in vacuo and the residue taken up in benzene. The solution is again evaporated, the residue distilled and the fraction boiling at 157°/0.075 mm. Hg collected; it represents the N-(2 - ethoxy-ethyl)-3-benzhydryl-piperidine, which is identical with the compound obtained according to Example 12.

Example 23

To the solution of 3 g. N-(2-hydroxy-ethyl)-4-benzhydryl-piperidine in the minimum amount of benzene, 0.6 g. of a 56% suspension of sodium hydride in mineral oil are added and the mixture refluxed for 1 hour. Hereupon 0.7 g. ethyl chloride in 20 ml. benzene are added and the mixture is refluxed for 6 hours while stirring. It is filtered, the filtrate evaporated, the residue distilled and the fraction boiling at 152–157°/0.175 mm. Hg collected; it represents the N-(2 - ethoxy-ethyl)-4-benzhydryl-piperidine, which is identical with the product obtained according to Example 13.

The starting material is prepared as follows: The mixture of 50.2 g. 4-diphenylmethyl-piperidine, 25.0 g. 2-bromoethanol, 36.0 g. sodium carbonate, 3 drops water and 170 ml. benzene is refluxed for 20 hours while stirring. It is filtered, the filtrate evaporated under reduced pressure, the residue distilled and the fraction boiling at 194 to 196°/0.05 mm. collected; it represents the N-(β-hydroxy-ethyl)-4-diphenylmethyl-piperidine.

Example 24

To the solution of 20.0 g. N-vinyl-3-benzhydryl-piperidine in 80 ml. benzene and 20 ml. ethanol, 1 ml. concentrated sulfuric acid and a trace of benzoyl-peroxide are added and the mixture allowed to stand overnight at room temperature. It is concentrated in vacuo, the concentrate poured over ice, the mixture extracted with benzene, the extract washed with aqueous sodium carbonate, dried, filtered and evaporated. The residue is distilled and the fraction boiling at 157°/0.075 mm. Hg collected; it represents the N-(2-ethoxy-ethyl)-3-benzhydryl - piperidine, which is identical with the compound obtained according to Example 12.

The starting material is obtained as follows: The mixture of 25.1 g. 3-benzhydryl-piperidine, 150 ml. benzene, 10.7 g. vinyl bromide, 18 g. sodium carbonate and a trace of water is refluxed for 20 hours while stirring. It is filtered and the filtrate evaporated in vacuo, to yield the N-vinyl-3-benzhydryl-piperidine, which is used as such without purification.

Example 25

The solution of 3 g. N-ethoxyacetyl-3-benzhydryl-piperidine in 20 ml. of tetrahydrofuran is added dropwise to the stirred solution of 0.2 g. lithium aluminum hydride in 20 ml. tetrahydrofuran and the mixture is refluxed for 10 hours. After cooling 0.2 ml. water, 0.15 ml. 20% aqueous sodium hydroxide and 0.7 ml. water are added in this order. The mixture is filtered, the filtrate evaporated in vacuo and the residue taken up in benzene. The solution is filtered, the filtrate evaporated, the residue distilled and the fraction boiling at 157°/0.075 mm. Hg collected; it represents the N-(2-ethoxy-ethyl)-3-benzhydryl-piperidine, which is identical with the compound obtained according to Example 12.

The starting material is prepared as follows: To the mixture of 25.1 g. 3-benzhydryl-piperidine and 75 ml. benzene is added dropwise while cooling and stirring and stirring is continued for an additional 2 hours at room temperature. The mixture is filtered and the filtrate evaporated in vacuo to yield the N-ethoxy-acetyl-3-benzhydryl-piperidine.

We claim:
1. A compound having the formula

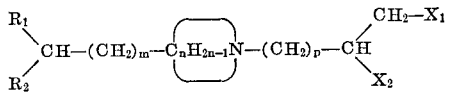

in which $R_1$ is phenyl, (lower alkyl)-phenyl, (lower alkoxy-phenyl, (halogeno)-phenyl or (di-lower alkylamino)-phenyl, $R_2$ is hydrogen or one of the radicals mentioned for $R_1$, $X_1$ is lower alkoxy, 2-tetrahydropyranyloxy, $R_1$-lower alkoxy, or the acetoxy radical, $X_2$ is hydrogen, $n$ is the integer 4 or 5 and each of $m$ and $p$ is an integer from 0 to 2, or the lower alkyl quaternaries or therapeutically acceptable acid addition salts thereof.

2. A compound as claimed in claim 1, in which $R_1$ is phenyl, $R_2$ is hydrogen or phenyl, $C_nH_{2n}$ is 1,5-pentylene, $X_1$ is methoxy, ethoxy or 2-tetrahydropyranyloxy, $X_2$ is hydrogen and each of $m$ and $p$ is an integer from 0 to 2 or therapeutically acceptable acid addition salts thereof.

3. A compound as claimed in claim 2, and being the N-(2-ethoxyethyl)-3-benzhydrylpiperidine or a therapeutically accepable acid addition salt thereof.

4. A compound as claimed in claim 2, and being the N-(2-ethoxyethyl)-4-benzhydrylpiperidine or a therapeutically acceptable acid addition salt thereof.

5. A compound as claimed in claim 2, and being the N-([2-(2-tetrahydropyranyloxy)-ethyl] - 3 - benzhydrylpiperidine or a therapeutically acceptable acid addition salt thereof.

6. A compound as claimed in claim 2 and being the N-[3-(2-tetrahydropyranyloxy)-propyl] - 3 - benzhydrylpiperidine or a therapeutically acceptable acid addition salt thereof.

References Cited

UNITED STATES PATENTS 2,075,359   3/1937   Salzberg et al. _____ 424—250
3,048,594   8/1962   Hoffmann et al. _____ 260—293
3,366,636   1/1968   Mull et al. _____ 260—293.4

HENRY R. JILES, Primary Examiner

S. D. WINTERS, Assistant Examiner

U.S. Cl. X.R.

260—239 B, 293 R, 293.4 G, 293.73, 293.78 293.83, 293.84, 294 A, 326.3, 326.5 D, 326.5 N, 326.8, 326.82, 326.84; 424—244, 267, 274